United States Patent
Li et al.

(10) Patent No.: US 11,481,725 B2
(45) Date of Patent: Oct. 25, 2022

(54) APPARATUS, SYSTEM AND METHOD FOR CONTROLLING LOGISTICS, AND NON-TRANSITORY COMPUTER READABLE MEDIUM

(71) Applicants: Chongqing BOE Optoelectronics Technology Co., Ltd., Chongqing (CN); BOE Technology Group Co., Ltd., Beijing (CN)

(72) Inventors: Bing Li, Beijing (CN); Baibing Liu, Beijing (CN)

(73) Assignees: Chongqing BOE Optoelectronics Technology Co., Ltd., Chongqing (CN); Beijing BOE Technology Development Co., Ltd., Beijing (CN)

( * ) Notice: Subject to any disclaimer, the term of this patent is extended or adjusted under 35 U.S.C. 154(b) by 720 days.

(21) Appl. No.: 16/398,748

(22) Filed: Apr. 30, 2019

(65) Prior Publication Data

US 2020/0097905 A1 Mar. 26, 2020

(30) Foreign Application Priority Data

Sep. 21, 2018 (CN) .......................... 201811109377.5

(51) Int. Cl.
*G06Q 10/08* (2012.01)
*G06F 9/48* (2006.01)
*G05B 19/418* (2006.01)

(52) U.S. Cl.
CPC ... *G06Q 10/0875* (2013.01); *G05B 19/41865* (2013.01); *G06F 9/4881* (2013.01)

(58) Field of Classification Search
CPC .......... G06Q 10/0875; G05B 19/41865; G06F 9/4881
See application file for complete search history.

(56) References Cited

U.S. PATENT DOCUMENTS 6,529,792 B1 * 3/2003 Sato ................. G05B 19/41865
700/121
7,664,561 B1 2/2010 Chen et al.
(Continued)

FOREIGN PATENT DOCUMENTS

CN 103101704 A 5/2013
CN 104401678 A 3/2015
(Continued)

OTHER PUBLICATIONS

Chinese Office Action dated Dec. 16, 2019 in related Chinese Application No. 201811109377.5.

*Primary Examiner* — Thomas C Lee
*Assistant Examiner* — Ameir Myers
(74) *Attorney, Agent, or Firm* — ArentFox Schiff LLP; Michael Fainberg

(57) ABSTRACT

The disclosure discloses an apparatus, method and system for controlling logistics, and a non-transitory computer readable medium, where the apparatus includes a processor configured to execute readable program codes stored in a memory to: obtain a logistics communication state corresponding to each material feeding port of each device; pair every two material feeding ports among material feeding ports of each device into a group, and determine a logistics communication state corresponding to each group of material feeding ports of each device; determine a handling priority corresponding to each device according to the determined logistics communication state corresponding to each group of material feeding ports of each device; and control a handling component to select one group of material feeding ports of a device with a highest handling priority to execute a handling command.

18 Claims, 5 Drawing Sheets

(56) References Cited

U.S. PATENT DOCUMENTS

| | | | |
|---|---|---|---|
| 2004/0220688 A1* | 11/2004 | Behrisch | G05B 19/41875 |
| | | | 700/96 |
| 2005/0154625 A1* | 7/2005 | Chua | G06Q 10/06 |
| | | | 700/100 |
| 2013/0079914 A1* | 3/2013 | Shibata | G05B 19/41825 |
| | | | 700/114 |
| 2015/0331716 A1* | 11/2015 | Brown | G06F 9/48 |
| | | | 718/103 |
| 2016/0101940 A1 | 4/2016 | Grinnell et al. | |
| 2018/0141759 A1 | 5/2018 | Rabe | |

FOREIGN PATENT DOCUMENTS

| | | |
|---|---|---|
| CN | 106485434 A | 3/2017 |
| CN | 106647764 A | 5/2017 |
| CN | 107108122 A | 8/2017 |
| CN | 107709199 A | 2/2018 |
| CN | 107748545 A | 3/2018 |
| CN | 207690141 U | 8/2018 |
| JP | 2004250184 A | 9/2004 |
| JP | 2004283994 A | 10/2004 |
| JP | 5970947 B2 | 8/2016 |

\* cited by examiner

APPARATUS, SYSTEM AND METHOD FOR CONTROLLING LOGISTICS, AND NON-TRANSITORY COMPUTER READABLE MEDIUM

CROSS-REFERENCE TO RELATED APPLICATION

This application claims priority to Chinese Patent Application No. 201811109377.5, filed on Sep. 21, 2018, the content of which is incorporated by reference in the entirety.

FIELD

This disclosure relates to the field of intelligent manufacturing, and particularly to an apparatus, system and method for controlling logistics, and a non-transitory computer readable medium.

DESCRIPTION OF THE RELATED ART

In the related art, a logistics system only interacts with devices via such simple communication signals in a practical production process of a factory that the logistics system lacks deep perception of production. Also since the logistics system less perceives production information of the devices, the logistics system cannot identify a demand of the devices for materials precisely, so if the logistics system is supplying materials to a plurality of production lines, then the logistics system will not control the materials to be handled to respective devices intelligently, so that the materials may tend to be not supplied in an equilibrium manner or handled in a timely manner, and thus the devices may be idled for a long period of time, which will degrade a throughput accordingly.

SUMMARY

Embodiments of the disclosure provide an apparatus, system and method for controlling logistics, and a non-transitory computer readable medium.

In an aspect, the embodiments of the disclosure provides an apparatus for controlling logistics, applicable to a system in which a handling component handles materials to at least two devices with a plurality of material feeding ports, wherein the apparatus including at least one processor and a memory, wherein the memory is configured to store readable program codes, and the at least one processor is configured to execute the readable program codes to: obtain a logistics communication state corresponding to each of the plurality of material feeding ports of each of the at least two devices; pair every two material feeding ports among the plurality of material feeding ports of each of the at least two devices into a group, and determine a logistics communication state corresponding to each group of material feeding ports of each of the at least two devices; determine a handling priority corresponding to each of the at least two devices according to the determined logistics communication state corresponding to each group of material feeding ports of each of the at least two devices; and control the handling component to select one group of material feeding ports of a device with a highest handling priority to execute a handling command.

In some embodiments, in the apparatus for controlling logistics according to the embodiments of the disclosure, the at least one processor is further configured to execute the readable program codes to: determine the handling priority corresponding to each of the at least two devices by referring to a pre-created correspondence relationship table between logistics communication states corresponding to respective groups of material feeding ports of respective devices, and handling priorities of the respective devices.

In some embodiments, in the apparatus for controlling logistics according to the embodiments of the disclosure, the at least one processor is further configured to execute the readable program codes to: determine, for the device with the highest handling priority, a group of material feeding ports with a highest handling priority according to logistics communication states corresponding to respective groups of material feeding ports of the device; and control the handling component to select the group of material feeding ports with the highest handling priority in the device with the highest handling priority to execute the handling command.

In some embodiments, in the apparatus for controlling logistics according to the embodiments of the disclosure, the at least one processor is further configured to execute the readable program codes to: select, among the plurality of material feeding ports of each of the at least two devices, one of first material feeding ports via dichotomy among current material feeding ports which are not paired, and select one of second material feeding ports via dichotomy among remaining material feeding ports which are not paired to constitute a group to pair every two material feeding ports among the plurality of material feeding ports of each of the at least two devices into a group.

In some embodiments, in the apparatus for controlling logistics according to the embodiments of the disclosure, the at least one processor is further configured to execute the readable program codes to: determine, for each group of material feeding ports, a material feeding port to which a material is most desirable according to logistics communication states corresponding respectively to a first material feeding port and a second material feeding port of the group of material feeding ports; and determine a logistics communication state corresponding to the material feeding port to which a material is most desirable as a logistics communication state corresponding to the group of material feeding ports.

In some embodiments, in the apparatus for controlling logistics according to the embodiments of the disclosure, the at least one processor is further configured to execute the readable program codes to: determine, for each group of material feeding ports, the material feeding port to which a material is most desirable by referring to a pre-created correspondence relationship table between logistics communication states of two material feeding ports in a pair of material feeding ports, and a logistics communication state of the pair of material feeding ports.

In some embodiments, in the apparatus for controlling logistics according to the embodiments of the disclosure, the logistics communication state corresponding to each of the plurality of material feeding ports of each of the at least two devices includes: Ready To Load, Reserved To Load, Ready To Process, Processing, Ready To Unload, or Reserved To Unload.

In some embodiments, in the apparatus for controlling logistics according to the embodiments of the disclosure, the at least one processor is further configured to execute the readable program codes to: determine, for each of the plurality of material feeding ports of each of the at least two devices, a state of Processing as a state of Pre-Processing or a state of End-Processing according to an amount of material in the material feeding port before a state of Ready To Process, and an amount of material in the material feeding port in the state of Processing; wherein both of the amount of material in the material feeding port before the state of Ready To Process, and the amount of material in the material feeding port in the state of Processing are detected by a sensor arranged in the material feeding port.

In some embodiments, in the apparatus for controlling logistics according to the embodiments of the disclosure, the at least one processor is further configured to execute the readable program codes to: determine the state of Processing as the state of Pre-Processing, when the amount of material in the material feeding port in the state of Processing is greater than or equal to a half of the amount of material in the material feeding port before the state of Ready To Process; or determine the state of Processing as the state of End-Processing, when the amount of material in the material feeding port in the state of Processing is less than a half of the amount of material in the material feeding port before the state of Ready To Process.

In another aspect, the embodiments of the disclosure further provide a system for controlling logistics, including a handling component, at least two devices with a plurality of material feeding ports, and the apparatus for controlling logistics according to the embodiments of the disclosure; wherein the handling component is configured to handle materials to the at least two devices under control of the apparatus for controlling logistics.

In still another aspect, the embodiments of the disclosure further provide a method for controlling logistics, wherein a handling component handles materials to at least two devices with a plurality of material feeding ports, wherein the method includes: obtaining a logistics communication state corresponding to each of the plurality of material feeding ports of each of the at least two devices; pairing every two material feeding ports among the plurality of material feeding ports of each of the at least two devices into a group, and determining a logistics communication state corresponding to each group of material feeding ports of each of the at least two devices; determining a handling priority corresponding to each of the at least two devices according to the determined logistics communication state corresponding to each group of material feeding ports of each of the at least two devices; and controlling the handling component to select one group of material feeding ports of a device with a highest handling priority to execute a handling command.

In some embodiments, in the method for controlling logistics according to the embodiments of the disclosure, determining the handling priority corresponding to each of the at least two devices according to the determined logistics communication state corresponding to each group of material feeding ports of each of the at least two devices includes: determining the handling priority corresponding to each of the at least two devices by referring to a pre-created correspondence relationship table between logistics communication states corresponding to respective groups of material feeding ports of respective devices, and handling priorities of the respective devices.

In some embodiments, in the method for controlling logistics according to the embodiments of the disclosure, the method further includes: determining, for the device with the highest handling priority, a group of material feeding ports with a highest handling priority according to logistics communication states corresponding to respective groups of material feeding ports of the device; controlling the handling component to select one group of material feeding ports of the device with the highest handling priority to execute the handling command includes: controlling the handling component to select the group of material feeding ports with the highest handling priority in the device with the highest handling priority to execute the handling command.

In some embodiments, in the method for controlling logistics according to the embodiments of the disclosure, pairing every two material feeding ports among the plurality of material feeding ports of each of the at least two devices into a group includes: selecting, among the plurality of material feeding ports of each of the at least two devices, one of first material feeding ports via dichotomy among current material feeding ports which are not paired, and selecting one of second material feeding ports via dichotomy among remaining material feeding ports which are not paired to constitute a group to pair every two material feeding ports among the plurality of material feeding ports of each of the at least two devices into a group.

In some embodiments, in the method for controlling logistics according to the embodiments of the disclosure, determining the logistics communication state corresponding to each group of material feeding ports includes: determining, for each group of material feeding ports, a material feeding port to which a material is most desirable according to logistics communication states corresponding respectively to a first material feeding port and a second material feeding port of the group of material feeding ports; and determining a logistics communication state corresponding to the material feeding port to which a material is most desirable as a logistics communication state corresponding to the group of material feeding ports.

In some embodiments, in the method for controlling logistics according to the embodiments of the disclosure, the material feeding port to which a material is most desirable is determined by referring to a pre-created correspondence relationship table between logistics communication states of two material feeding ports in a pair of material feeding ports, and a logistics communication state of the pair of material feeding ports.

In some embodiments, in the method for controlling logistics according to the embodiments of the disclosure, the logistics communication state corresponding to each of the plurality of material feeding ports of each of the at least two devices includes: Ready To Load, Reserved To Load, Ready To Process, Processing, Ready To Unload, or Reserved To Unload.

In some embodiments, in the method for controlling logistics according to the embodiments of the disclosure, the method further includes: determining, for each of the plurality of material feeding ports of each of the at least two devices, a state of Processing as a state of Pre-Processing or a state of End-Processing according to an amount of material in the material feeding port before a state of Ready To Process, and an amount of material in the material feeding port in the state of Processing; wherein both of the amount of material in the material feeding port before the state of Ready To Process, and the amount of material in the material feeding port in the state of Processing are detected by a sensor arranged in the material feeding port.

In some embodiments, in the method for controlling logistics according to the embodiments of the disclosure, determining the state of Processing as the state of Pre-Processing or the state of End-Processing includes: determining the state of Processing as the state of Pre-Processing, when the amount of material in the material feeding port in the state of Processing is greater than or equal to a half of the amount of material in the material feeding port before the state of Ready To Process; or determining the state of Processing as the state of End-Processing, when the amount of material in the material feeding port in the state of Processing is less than a half of the amount of material in the material feeding port before the state of Ready To Process.

In yet another aspect, the embodiments of the disclosure further provide a non-transitory computer readable medium, including program codes, wherein the program codes are configured to be run on a computing device to cause the computing device to perform operations in the method for controlling logistics according to the embodiments of the disclosure.

BRIEF DESCRIPTION OF THE DRAWINGS

In order to make the technical solutions according to the embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

Figure 1:
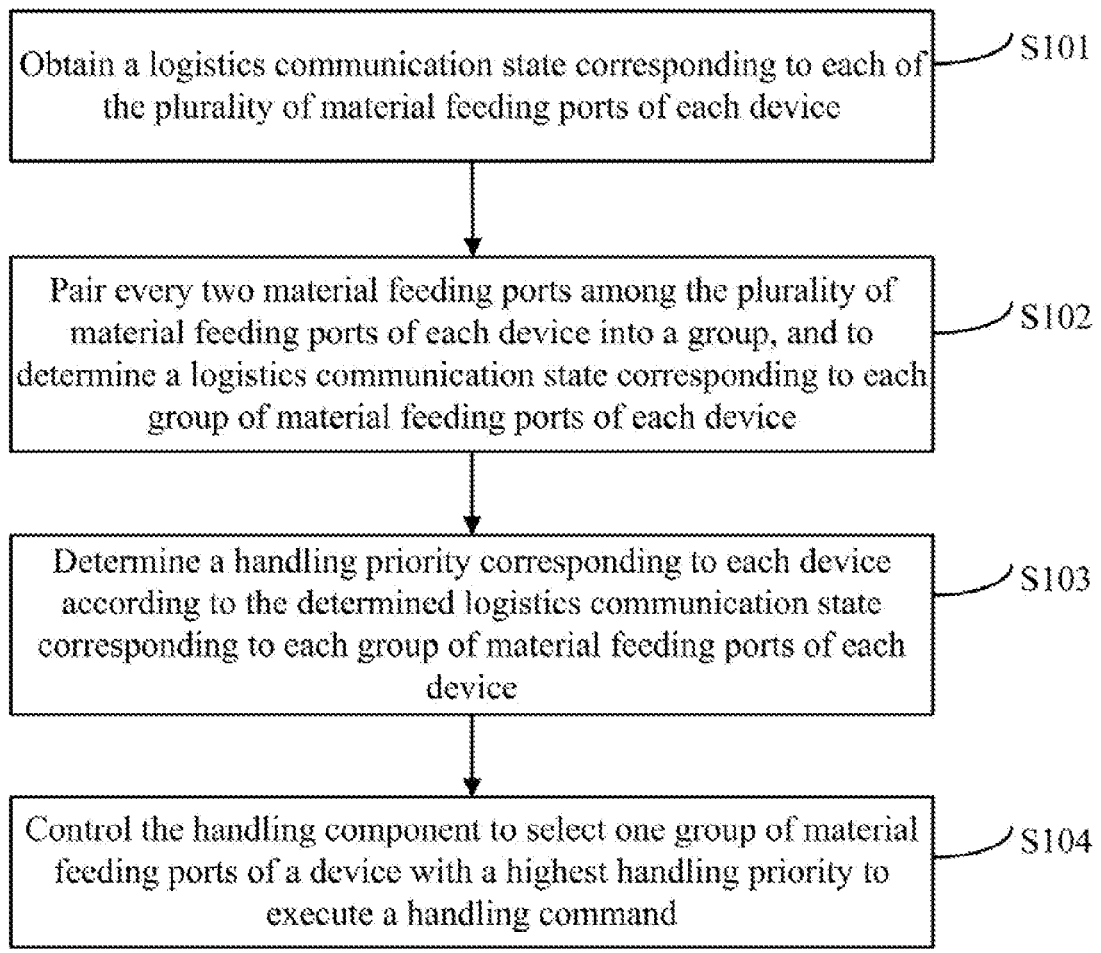
FIG. 1 is a flow chart of a method for controlling logistics according to the embodiments of the disclosure.

In order to make the objects, technical solutions, and advantages of the disclosure more apparent, the disclosure will be described below in further details with reference to the drawings, and apparently the embodiments to be described are only a part but all of the embodiments of the disclosure. Based upon the embodiments here of the disclosure, all of other embodiments which can occur to those ordinarily skilled in the art without any inventive effort shall come into the scope of the disclosure as claimed.

The shapes and sizes of respective components in the drawings are not intended to reflect any real proportion, but only intended to illustrate the content of the disclosure.

As illustrated in FIG. 1, the embodiments of the disclosure provide a method for controlling logistics, where a handling component handles materials to at least two devices, and each device includes a plurality of material feeding ports; and the method includes the following operations.

The operation S101 is to obtain a logistics communication state corresponding to each of the plurality of material feeding ports of each device.

The operation S102 is to pair every two material feeding ports among the plurality of material feeding ports of each device into a group, and to determine a logistics communication state corresponding to each group of material feeding ports of each device.

The operation S103 is to determine a handling priority corresponding to each device according to the determined logistics communication state corresponding to each group of material feeding ports of each device.

The operation S104 is to control the handling component to select one group of material feeding ports of a device with a highest handling priority to execute a handling command.

The method for controlling logistics according to the embodiments of the disclosure obtains the logistics communication state corresponding to each material feeding port of each device; pairs every two material feeding ports among the material feeding ports of each device into a group, and determines the logistics communication state corresponding to each group of material feeding ports of each device; determines the handling priority corresponding to each device according to the determined logistics communication state corresponding to each group of material feeding ports of each device; and controls the handling component to select one group of material feeding ports of the device with the highest handling priority to execute a handling command. In this way, logistics distribution of the devices can be controlled intelligently to thereby improve the handling efficiency of the logistics system, shorten a period of time for which the devices are idled, and improve the utilization ratio and the throughput of the devices.

In some embodiments, in the method for controlling logistics according to the embodiments of the disclosure, after determine the handling priority corresponding to each device according to the determined logistics communication state corresponding to each group of material feeding ports of each device, the method further includes: when there are at least two devices with the highest priority, the handling component selects one group of material feeding ports of each of the at least two devices with the highest priority in a sequential order of instances of time when handling priorities are determined, to execute a handling command.

In some embodiments, in the method for controlling logistics according to the embodiments of the disclosure, determining the handling priority corresponding to each device according to the determined logistics communication state corresponding to each group of material feeding ports of each device includes: referring, based upon the determined logistics communication state corresponding to each group of material feeding ports of each device, to a pre-created correspondence relationship table between logistics communication states corresponding to respective groups of material feeding ports of respective devices, and their handling priorities, to thereby determine the handling priority corresponding to each device.

In some embodiments, the method for controlling logistics according to the embodiments of the disclosure further includes: for the device with the highest handling priority, determining a group of material feeding ports with a highest handling priority according to logistics communication states corresponding to respective groups of material feeding ports of the device.

Accordingly, controlling the handling component to select one group of material feeding ports of the device with the highest handling priority to execute a handling command includes: controlling the handling component to select the group of material feeding ports with the highest handling priority in the device with the highest handling priority to execute the handling command.

In some embodiments, the group of material feeding ports with the highest handling priority in the device with the highest handling priority can be determined by referring to a pre-created correspondence relationship table between logistics communication states corresponding to respective groups of material feeding ports, and handling priorities of the respective groups of material feeding ports; or of course, the handling component can select one group of material feeding ports which is the first to pair in the device with the highest handling priority to execute a handling command, or can adjust priorities of respective groups of material feeding ports according to a practical production demand, although the embodiments of the disclosure will not be limited thereto.

In some embodiments, in the method for controlling logistics according to the embodiments of the disclosure, each device includes a plurality of first material feeding ports, and a plurality of second material feeding ports, and a device in operation shall process both of materials in a first material feeding port and a second material feeding port simultaneously, so the materials shall be handled by pairing one of the first material feeding ports with one of the second material feeding ports to thereby form a group of material feeding ports.

In some embodiments, in the method for controlling logistics according to the embodiments of the disclosure, pairing every two material feeding ports among the plurality of material feeding ports of each device into a group includes: selecting, among the plurality of material feeding ports of each device, one of first material feeding ports via dichotomy among current material feeding ports which are not paired, and select one of second material feeding ports via dichotomy among remaining material feeding ports which are not paired to constitute a group to pair every two material feeding ports among the plurality of material feeding ports of each device into a group. Where, the material feeding ports can be selected via dichotomy to thereby speed up pairing.

In some embodiments, in the method for controlling logistics according to the embodiments of the disclosure, determining the logistics communication state corresponding to each group of material feeding ports includes: determining, for each group of material feeding ports, a material feeding port to which a material is most desirable according to logistics communication states corresponding respectively to a first material feeding port and a second material feeding port of the group of material feeding ports; and determining a logistics communication state corresponding to the material feeding port to which a material is most desirable as a logistics communication state corresponding to the group of material feeding ports.

In some embodiments, in the method for controlling logistics according to the embodiments of the disclosure, the material feeding port to which a material is most desirable is determined by referring to a pre-created correspondence relationship table between logistics communication states of two material feeding ports in a pair of material feeding ports, and a logistics communication state of the pair of material feeding ports.

Stated otherwise, in a practical implementation, for a group of material feeding ports, a material feeding port to which a material is most desirable among the first material feeding port and the second material feeding port of the group of material feeding ports is determined by referring to the above table according to the logistics communication states corresponding respectively to the first material feeding port and the second material feeding port; and the logistics communication state corresponding to the material feeding port to which a material is most desirable is determined as the logistics communication state corresponding to the group of material feeding ports.

In some embodiments, in the method for controlling logistics according to the embodiments of the disclosure, a logistic communication state corresponding to a material feeding port includes: Ready To Load, Reserved To Load, Ready To Process, Processing, Ready To Unload, or Reserved To Unload.

In some embodiments, in the method for controlling logistics according to the embodiments of the disclosure, in order to detect a production process of the devices, the method further includes: determining, for each material feeding port, a state of Processing as a state of Pre-Processing or a state of End-Processing according to an amount of material in the material feeding port before a state of Ready To Process, and an amount of material in the material feeding port in the state of Processing, both of which are detected by a sensor arranged in the material feeding port.

In some embodiments, in the method for controlling logistics according to the embodiments of the disclosure, determining the state of Processing as the state of Pre-Processing or the state of End-Processing, includes: when the amount of material in the material feeding port in the state of Processing is greater than or equal to half of the amount of material in the material feeding port before the state of Ready To Process, determining the state of Processing as the state of Pre-Processing; or when the amount of material in the material feeding port in the state of Processing is less than half of the amount of material in the material feeding port before the state of Ready To Process, determining the state of Processing as the state of End-Processing.

Further, the method for controlling logistics according to the embodiments of the disclosure will be described below in details by taking logistics control in the production of a display panel as an example.

Figure 2:
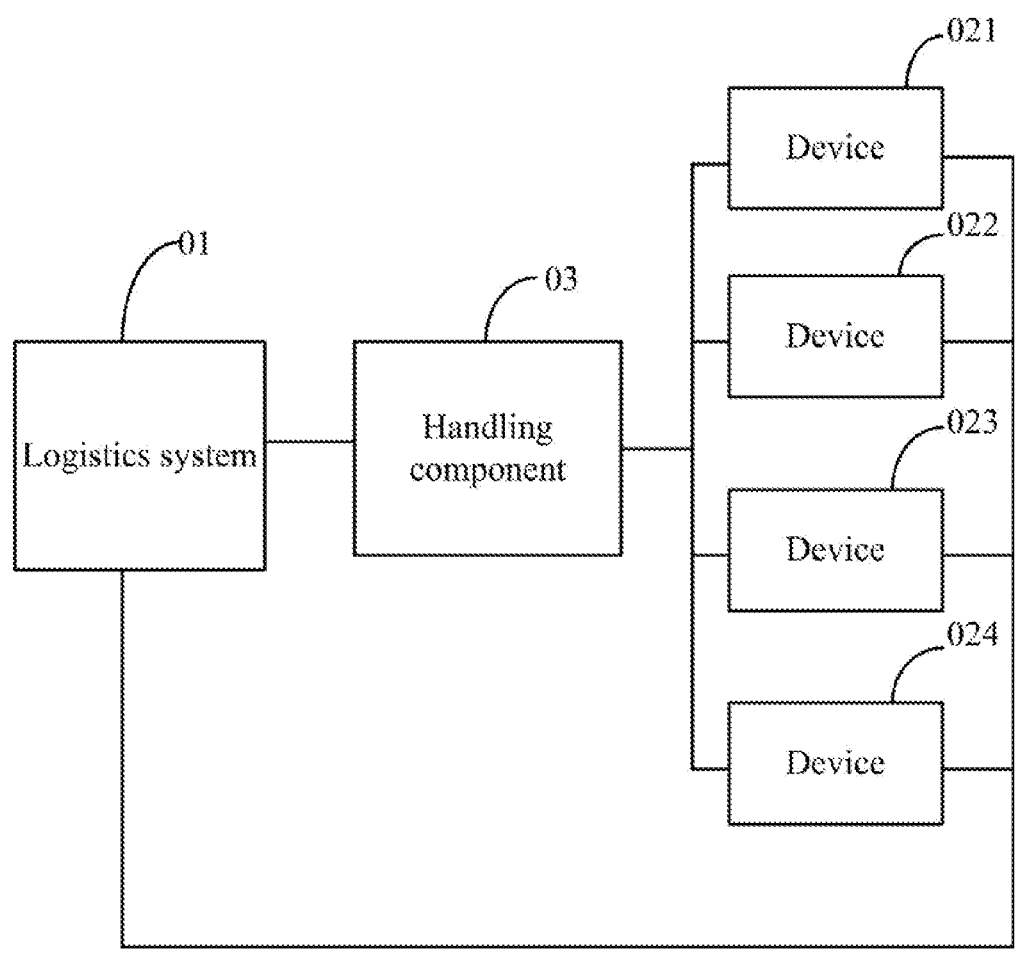
FIG. 2 is a schematic structural diagram of a relationship between devices and a handling component according to the embodiments of the disclosure.

As illustrated in FIG. 2, for example, a logistics system 01 controls one handling component 03 to handle materials to four devices 021, 022, 023, and 024, and each device includes a plurality of material feeding ports, such as port1 to port4, and both an array substrate and a color filter substrate shall be put into production, where the array substrate can only be fed to the production devices through the first material feeding ports including the port 1 and the port 2, and the color filter substrate can only be fed to the production devices through the second material feeding ports including the port 3 and the port 4.

A logistics communication state corresponding to each material feeding port includes one of following states.

Ready To Load, in which there is no cassette (CST) on the material feeding port, so it is required to load a CST carrying a material thereto, e.g., a CST carrying an array substrate, or a CST carrying a color filter substrate.

Reserved To Load, in which there is a command to load a CST carrying an array substrate or a color filter substrate to the material feeding port.

Ready To Process, in which there is an array substrate or a color filter substrate, on the material feeding port, waiting for production in a device.

Processing, in which an array substrate or a color filter substrate is being processed in a device.

Ready To Unload, in which there is no substrate in a CST on the material feeding port, it is required to unload the empty CST.

Reserved To Load, in which there is a command to unload the CST.

Figure 3:
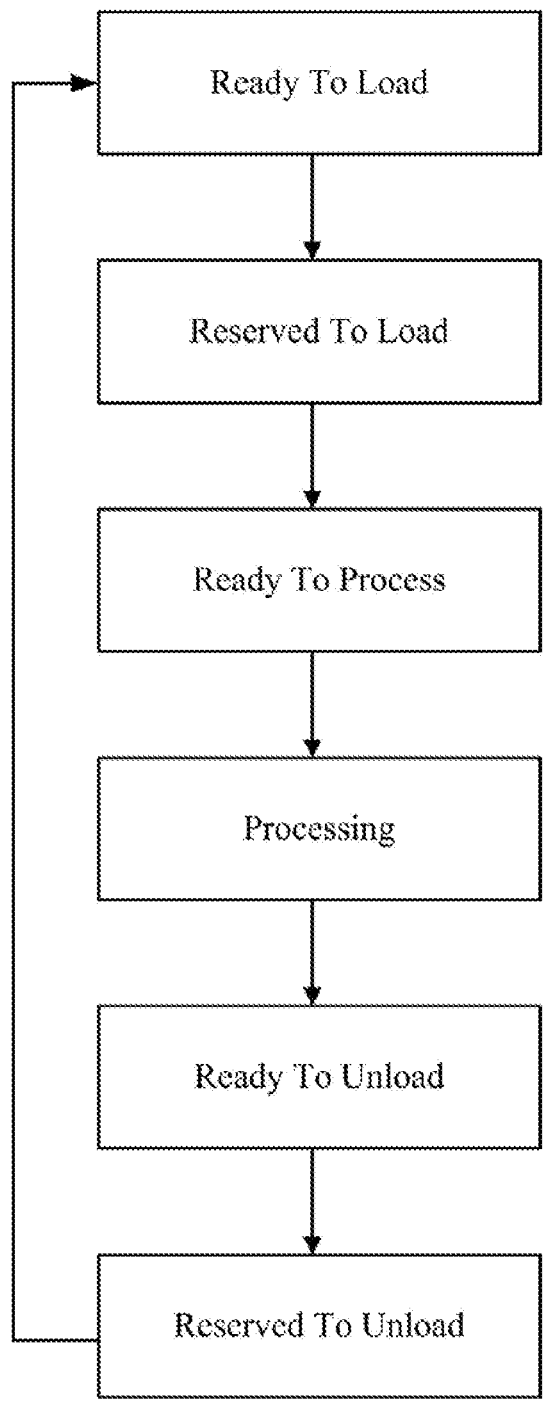
FIG. 3 is a first schematic diagram of an order of a logistics communication state corresponding to a material feeding port according to the embodiments of the disclosure.

Where, for a material feeding port, FIG. 3 illustrates a corresponding order of a logistics communication state thereof as Ready To Load→Reserved To Load→Ready To Process→Processing→Ready To Unload→Reserved To Load.

In some embodiments, in order to detect a production process of the devices, that is, to determine a production state of the devices as Just Start or Near to End, the embodiments of the disclosure provide a method for identifying a production process of a device intelligently, where the method includes: determining Processing as Pre-Processing or End-Processing according to the number of substrates acquired by a sensor in a material feeding port.

Where, in the Pre-Processing state, the number of substrates remaining in a CST in the material feeding port in the Processing state is greater than or equal to a half of the number of substrates remaining in the CST before Ready to Process; and, in the End-Processing state, the number of substrates remaining in the CST in the material feeding port in the Processing state is less than a half of the number of substrates remaining in the CST before Ready to Process.

Figure 4:
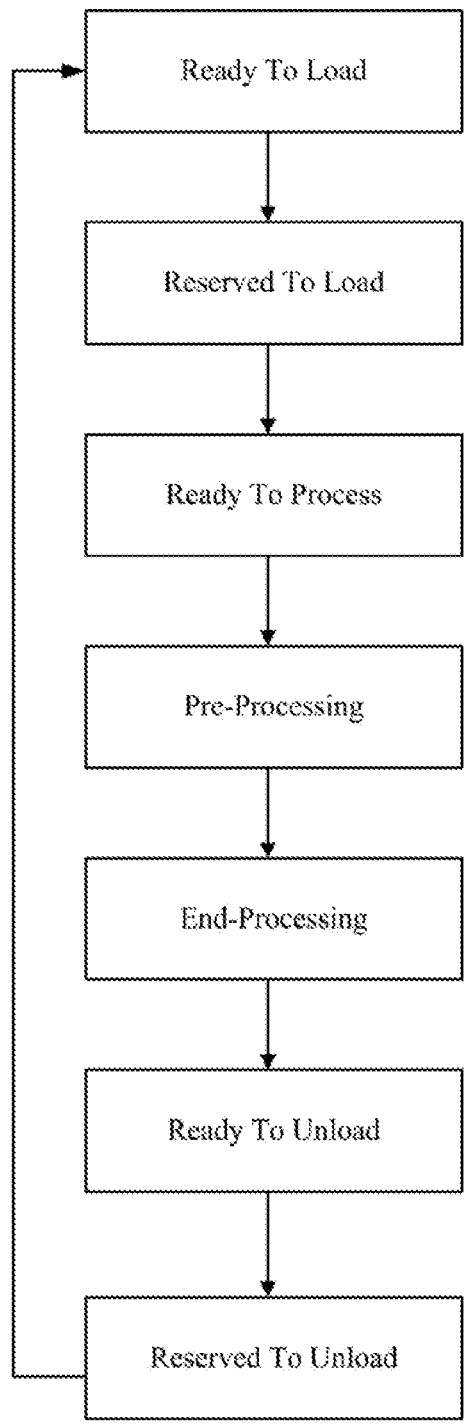
FIG. 4 is a second schematic diagram of an order of a logistics communication state corresponding to a material feeding port according to the embodiments of the disclosure.

For a material feeding port, FIG. 4 illustrates a corresponding order of a logistics communication state thereof as Ready To Load→Reserved To Load→Ready To Process-→Pre-Processing→End-Processing→Ready To Unload-→Reserved To Load.

In this way, the production process is made visible so that when the logistics communication state of the material feeding port is Pre-Processing, that is, the production just starts, there is no need to handle a material hurriedly; and when the logistics communication state of the material feeding port is End-Processing, that is, the production is ending soon, a material needs to be handled, so logistics distribution can be controlled more reasonably by detecting the production process.

Figure 5:
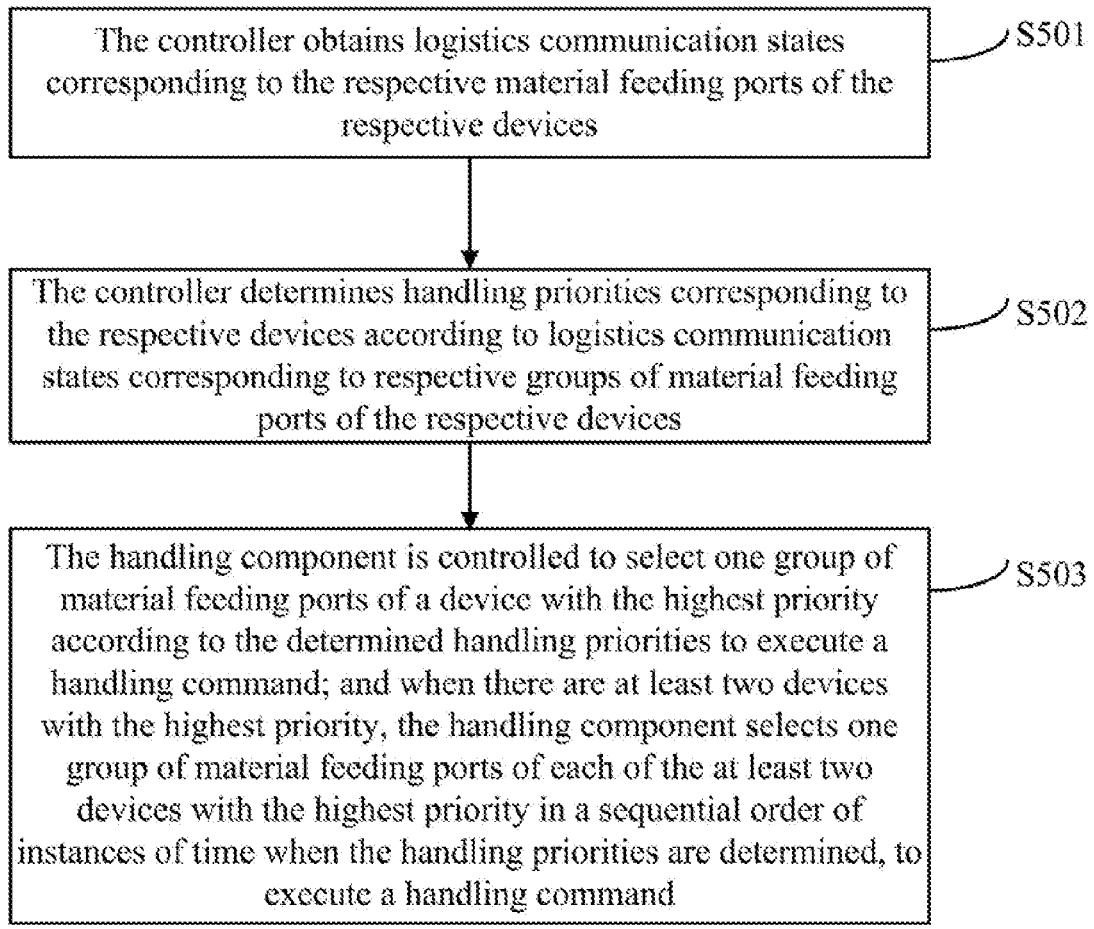
FIG. 5 is another flow chart of a method for controlling logistics according to the embodiments of the disclosure.

In some embodiments, the handling component is controlled by a controller (or a processor) in the logistics system, and in a practical application, each material feeding port of each device has a corresponding logistics communication state. And the logistics system controls logistics of the handling component in such a way that sensors identify the amounts of materials, changes to the amounts of materials, positions of the materials, and other material data in respective material feeding ports, and the controller is configured to perform the following operations as illustrated in FIG. 5 according to the material data detected by the sensors.

In the operation S501, the controller obtains logistics communication states corresponding to the respective material feeding ports of the respective devices.

In some embodiments, the controller determines corresponding logistics communication states according to material data of the respective material feeding ports of the respective devices provided by the sensors.

In the operation S502, the controller determines handling priorities corresponding to the respective devices according to logistics communication states corresponding to respective groups of material feeding ports of the respective devices. In some embodiments, for each device, a first material feeding port is selected for pairing via dichotomy among the current material feeding ports which are not paired (where an array substrate will be handled via the first material feeding port), and a second material feeding port is selected for pairing via dichotomy among the remaining material feeding ports which are not paired (where a color filter substrate will be handled via the second material feeding port); and the remaining material feeding ports of the device are paired in the similar way sequentially. For example, for the device 021, firstly the port 1 is selected via dichotomy from the first material feeding ports including the port 1 and the port 2, and then the port 3 is selected via dichotomy from the second material feeding ports including the port 3 and the port 4; the port 1 and the port 3 are paired as a group, port11, of material feeding ports; and the port 2 and the port 4 are paired as a group, port12, of material feeding ports. For the device 021, the material feeding ports are paired as two groups of material feeding ports, port11 and port12. Alike, for the device 022, the material feeding ports are paired as two groups of material feeding ports, port21 and port22; for the device 023, the material feeding ports are paired as two groups of material feeding ports, port31 and port32; and for the device 024, the material feeding ports are paired as two groups of material feeding ports, port41 and port42.

For each group of material feeding ports of each device, a logistics communication state corresponding to a material feeding port to which a material is most desirable is determined as a logistics communication state corresponding to the group of material feeding ports according to logistics communication states corresponding respectively to a first material feeding port and a second material feeding port of the group of material feeding ports. Take port11 of the device 021 as an example, the logistics communication state corresponding to port11 can be depicted in the following table.

| Port Type | Logistics communication state of a pair of material feeding ports | | | | | | |
|---|---|---|---|---|---|---|---|
| port1 | Ready To Load | Ready To Load | Reserved To Load | Reserved To Load | Ready To Process | Pre-Processing | End-Processing |
| Port3 | Ready To Load | Reserved To Load | Reserved To Load | Ready To Process | Ready To Process | Pre-Processing | End-Processing |
| Port11 | Ready To Load | Reserved To Load | Reserved To Load | Reserved To Load | Ready To Process | Pre-Processing | End-Processing |
| port1 | Processing | Ready To Unload | Ready To Unload | Reserved To Unload | Reserved To Unload | Ready To Unload | Ready To Process |
| Port3 | Ready To Unload | Ready To Unload | Reserved To Unload | Reserved To Unload | Ready To Load | Ready To Load | Processing |
| Port11 | Ready To Unload | Ready To Unload | Reserved To Unload | Reserved To Unload | Reserved To Unload | Ready To Unload | Ready To Process |

In some embodiments, a correspondence relationship table between logistics communication states of two material feeding ports in a pair of material feeding ports, and a logistics communication state of the pair of material feeding ports can be pre-created, and when the logistics system obtains logistics communication states corresponding respectively to a first material feeding port and a second material feeding port in a pair of material feeding ports, it can determine a material feeding port to which a material is more desirable among the first material feeding port and the second material feeding port by referring to the table, and determine a logistics communication state corresponding to the material feeding port to which a material is more desirable as the logistics communication state corresponding to the group of material feeding ports.

In this way, the logistics communication state corresponding to each group of material feeding ports of each device can be determined so that the logistics system determines the corresponding handling priority of each device. In some embodiments, the handling priority corresponding to each device is determined by referring to a pre-created correspondence relationship table between logistics communication states of respective groups of material feeding ports, and a handling priority corresponding to each device according to the logistics communication states of the respective groups of material feeding ports of the device; where the pre-created correspondence relationship table between logistics communication states and a handling priority includes handling demand levels generalized from actual handling instances.

Taking the device 021 as an example, the handling priority corresponding to the device 021 is determined according to logistics communication states corresponding respectively to two groups, Port 11 and Port 12, of material feeding ports of the device 021, for example, as one of four levels including 1 representing Extremely Desirable To Load, 2 representing Highly Desirable To Load, 3 representing Desirable To Load, and 4 representing Undesirable To Load. The handling priority corresponding to the device 021 can be as depicted in the following table.

the groups of material feeding ports of the device 021 to execute a handling command, and then select one of the groups of material feeding ports of the device 023 to execute a handling command.

In some embodiments, the one group of material feeding ports of the device with the highest handling priority can be selected by selecting a group of material feeding ports with the highest handling priority according to the logistics communication states of the respective groups of material feeding ports of the device to execute a handling command. In this way, the handling component can select a group of material feeding ports with the highest handling priority in the device with the highest handling priority to execute a handling command, so that logistics distribution of the devices can be controlled intelligently to thereby improve the handling efficiency of the logistics system, shorten a period of time for which the devices are idled, and improve the utilization ratio and the throughput of the devices.

In some embodiments, when the display panel is One-Drop Filled (ODF) using an Automatic Material Handling System (AMHS), if logistics is controlled using the method above according to the embodiments of the disclosure, an idling ratio of ODF devices will be lowered by a factor of 88.4% (i.e., from 1.38% in the related art to 0.16%), so the method for controlling logistics according to the embodiments of the disclosure can address the problem in the production process in the related art, and improve the throughput of the devices.

Figure 6:
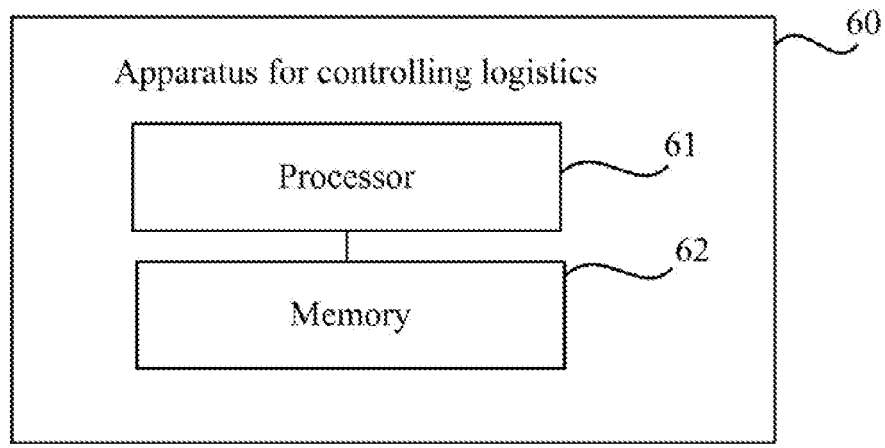
FIG. 6 is a schematic structural diagram of an apparatus for controlling logistics according to the embodiments of the disclosure.

Based upon the same inventive concept, as illustrated in FIG. 6, the embodiments of the disclosure further provide an

| Port name | Handling priority corresponding to the device 021 | | | | | | |
| --- | --- | --- | --- | --- | --- | --- | --- |
| Port 11 | Ready To Load | Ready To Load | Ready To Load | Ready To Load | Ready To Load | Ready To Load | Ready To Load |
| Port 12 | Ready To Load | Reserved To Load | Ready To Process | Pre-Processing | End-Processing | Ready To Unload | Reserved To Unload |
| Handling priority | 1 | 2 | 3 | 4 | 3 | 1 | 1 |
| Port 11 | Ready To Unload | Ready To Unload | Ready To Unload | Ready To Unload | Ready To Unload | Ready To Unload | Ready To Unload |
| Port 12 | Ready To Unload | Reserved To Unload | Ready To Load | Reserved To Load | Ready To Process | Pre-Processing | End-Processing |
| Handling priority | 1 | 2 | 1 | 2 | 3 | 4 | 2 |

Alike, there is a handling priority corresponding to each device.

In the operation S503, the handling component is controlled to select one group of material feeding ports of a device with the highest priority according to the determined handling priorities to execute a handling command; and when there are at least two devices with the highest priority, the handling component selects one group of material feeding ports of each of the at least two devices with the highest priority in a sequential order of instances of time when the handling priorities are determined, to execute a handling command.

For example, the logistics system determines the handling priorities of the device 021 and the device 023 as the level 1, the handling priority of the device 022 as the level 2, and handling priority of the device 024 as the level 4, so the devices with the highest priority are the device 021 and the device 023. If the handling priority of the device 021 is determined at an earlier instance of time than an instance of time when the handling priority of the device 023 is determined, then the handling component will firstly select one of apparatus for controlling logistics, which is applicable to a system in which a handling component handles materials to at least two devices with a plurality of material feeding ports, where the apparatus 60 for controlling logistics includes at least one processor 61 and a memory 62, where the memory 62 is configured to store readable program codes, and the at least one processor 61 is configured to execute the readable program codes to: obtain a logistics communication state corresponding to each of the plurality of material feeding ports of each of the at least two devices; pair every two material feeding ports among the plurality of material feeding ports of each of the at least two devices into a group, and determine a logistics communication state corresponding to each group of material feeding ports of each of the at least two devices; determine a handling priority corresponding to each of the at least two devices according to the determined logistics communication state corresponding to each group of material feeding ports of each of the at least two devices; and control the handling component to select one group of material feeding ports of a device with a highest handling priority to execute a handling command.

In some embodiments, in the apparatus 60 for controlling logistics according to the embodiments of the disclosure, the at least one processor 61 is further configured to execute the readable program codes to: determine the handling priority corresponding to each of the at least two devices by referring to a pre-created correspondence relationship table between logistics communication states corresponding to respective groups of material feeding ports of respective devices, and handling priorities of the respective devices.

In some embodiments, in the apparatus 60 for controlling logistics according to the embodiments of the disclosure, the at least one processor 61 is further configured to execute the readable program codes to: determine, for the device with the highest handling priority, a group of material feeding ports with a highest handling priority according to logistics communication states corresponding to respective groups of material feeding ports of the device; and control the handling component to select the group of material feeding ports with the highest handling priority in the device with the highest handling priority to execute the handling command.

In some embodiments, in the apparatus 60 for controlling logistics according to the embodiments of the disclosure, the at least one processor 61 is further configured to execute the readable program codes to: select, among the plurality of material feeding ports of each of the at least two devices, one of first material feeding ports via dichotomy among current material feeding ports which are not paired, and select one of second material feeding ports via dichotomy among remaining material feeding ports which are not paired to constitute a group to pair every two material feeding ports among the plurality of material feeding ports of each of the at least two devices into a group.

In some embodiments, in the apparatus 60 for controlling logistics according to the embodiments of the disclosure, the at least one processor 61 is further configured to execute the readable program codes to: determine, for each group of material feeding ports, a material feeding port to which a material is most desirable according to logistics communication states corresponding respectively to a first material feeding port and a second material feeding port of the group of material feeding ports; and determine a logistics communication state corresponding to the material feeding port to which a material is most desirable as a logistics communication state corresponding to the group of material feeding ports.

In some embodiments, in the apparatus 60 for controlling logistics according to the embodiments of the disclosure, the at least one processor 61 is further configured to execute the readable program codes to: determine, for each group of material feeding ports, the material feeding port to which a material is most desirable by referring to a pre-created correspondence relationship table between logistics communication states of two material feeding ports in a pair of material feeding ports, and a logistics communication state of the pair of material feeding ports.

In some embodiments, in the apparatus 60 for controlling logistics according to the embodiments of the disclosure, the logistics communication state corresponding to each of the plurality of material feeding ports of each of the at least two devices includes: Ready To Load, Reserved To Load, Ready To Process, Processing, Ready To Unload, or Reserved To Unload.

In some embodiments, in the apparatus 60 for controlling logistics according to the embodiments of the disclosure, the at least one processor 61 is further configured to execute the readable program codes to: determine, for each of the plurality of material feeding ports of each of the at least two devices, a state of Processing as a state of Pre-Processing or a state of End-Processing according to an amount of material in the material feeding port before a state of Ready To Process, and an amount of material in the material feeding port in the state of Processing, both of which are detected by a sensor arranged in the material feeding port.

In some embodiments, in the apparatus 60 for controlling logistics according to the embodiments of the disclosure, the at least one processor 61 is further configured to execute the readable program codes to: determine the state of Processing as the state of Pre-Processing, when the amount of material in the material feeding port in the state of Processing is greater than or equal to a half of the amount of material in the material feeding port before the state of Ready To Process; or determine the state of Processing as the state of End-Processing, when the amount of material in the material feeding port in the state of Processing is less than a half of the amount of material in the material feeding port before the state of Ready To Process.

Further, it shall be noted that, the apparatus 60 for controlling logistics can be the logistics system 01 or a sub-component of the logistics system 01 as illustrated in FIG. 2, which will not be limited herein.

Based upon the same inventive concept, the embodiments of the disclosure further provide a system for controlling logistics, including a handling component, at least two devices with a plurality of material feeding ports, and the apparatus above for controlling logistics according to the embodiments of the disclosure; where the handling component is configured to handle materials to the at least two devices under control of the apparatus for controlling logistics.

In some embodiments, the system for controlling logistics further includes sensors arranged in respective material feeding ports.

Further, since the system for controlling logistics addresses the problem under a similar principle to the method or apparatus above for controlling logistics, reference can be made to the implementations of the method or apparatus above for controlling logistics, so a repeated description thereof will be omitted herein.

Based upon the same inventive concept, the embodiments of the disclosure further provide a non-transitory computer readable medium including program codes, where the program codes are configured to be run on a computing device to cause the computing device to perform the operations in the method above for controlling logistics. Since the non-transitory computer readable medium addresses the problem under a similar principle to the method above for controlling logistics, reference can be made to the implementation of the method above for controlling logistics, so a repeated description thereof will be omitted herein.

Where, a program product is further provided, the program product can include any combination of one or more readable mediums, which can be a readable signal medium or a readable storage medium.

The program codes for performing the operations according to the disclosure can be written in any combination of one or more program designing languages. The program codes can be all executed on a user computing device, partially executed on a user device, executed as a separate software packet, partially executed on a user computing device and partially executed on a remote computing device, or all executed on a remote computing device or a server. In the case that a part or all of the program codes are executed on a remote computing device, the remote computing device can be connected with a user computing device through any kind of network including a Local Area Network (LAN) or a Wide Area Network (WAN), or can be connected with an external computing device.

Those skilled in the art can clearly appreciate from the foregoing description of the embodiments that the embodiments of the disclosure can be implemented in hardware, or can be implemented in software plus a necessary general hardware platform. Based upon such understanding, the technical solutions according to the embodiments of the disclosure can be embodied in the form of a software product which can be stored in a nonvolatile storage medium (e.g., a CD-ROM, a mobile hard disk, etc.) and which includes several instructions to cause a computer device (e.g., a personal computer, a server, a network device, etc.) to perform the method according to the respective embodiments of the disclosure.

Those skilled in the art can appreciate that the drawings are merely schematic diagrams of the preferred embodiments, and the modules or the flows in the drawings may not be necessary to the embodiments of the disclosure.

The embodiments of the disclosure have been numbered only for the sake of a convenient description but will not suggest any superiority of one embodiment to another.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. An apparatus for controlling logistics, applicable to a system in which a handling component handles materials to at least two devices with a plurality of material feeding ports, wherein the apparatus comprising at least one processor and a memory, wherein the memory is configured to store readable program codes, and the at least one processor is configured to execute the readable program codes to:
    obtain a logistics communication state corresponding to each of the plurality of material feeding ports of each of the at least two devices;
    pair every two material feeding ports among the plurality of material feeding ports of each of the at least two devices into a group, and determine a logistics communication state corresponding to each group of material feeding ports of each of the at least two devices;
    determine a handling priority corresponding to each of the at least two devices according to the determined logistics communication state corresponding to each group of material feeding ports of each of the at least two devices; and
    adjusting an operation of the apparatus to control the handling component to select one group of material feeding ports of a device with a highest handling priority to execute a handling command;
    wherein the at least one processor is further configured to execute the readable program codes to:
    determine the handling priority corresponding to each of the at least two devices by referring to a pre-created correspondence relationship table between logistics communication states corresponding to respective groups of material feeding ports of respective devices, and handling priorities of the respective devices.

2. The apparatus according to claim 1, wherein the at least one processor is further configured to execute the readable program codes to:
    determine, for the device with the highest handling priority, a group of material feeding ports with a highest handling priority according to logistics communication states corresponding to respective groups of material feeding ports of the device; and
    control the handling component to select the group of material feeding ports with the highest handling priority in the device with the highest handling priority to execute the handling command.

3. The apparatus according to claim 1, wherein the at least one processor is further configured to execute the readable program codes to:
    select, among the plurality of material feeding ports of each of the at least two devices, one of first material feeding ports via dichotomy among current material feeding ports which are not paired, and select one of second material feeding ports via dichotomy among remaining material feeding ports which are not paired to constitute a group to pair every two material feeding ports among the plurality of material feeding ports of each of the at least two devices into a group.

4. The apparatus according to claim 3, wherein the at least one processor is further configured to execute the readable program codes to:
    determine, for each group of material feeding ports, a material feeding port to which a material is most desirable according to logistics communication states corresponding respectively to a first material feeding port and a second material feeding port of the group of material feeding ports; and
    determine a logistics communication state corresponding to the material feeding port to which a material is most desirable as a logistics communication state corresponding to the group of material feeding ports.

5. The apparatus according to claim 4, wherein the at least one processor is further configured to execute the readable program codes to:
    determine, for each group of material feeding ports, the material feeding port to which a material is most desirable by referring to a pre-created correspondence relationship table between logistics communication states of two material feeding ports in a pair of material feeding ports, and a logistics communication state of the pair of material feeding ports.

6. The apparatus according to claim 1, wherein the logistics communication state corresponding to each of the plurality of material feeding ports of each of the at least two devices comprises: Ready To Load, Reserved To Load, Ready To Process, Processing, Ready To Unload, or Reserved To Unload.

7. The apparatus according to claim 6, wherein the at least one processor is further configured to execute the readable program codes to:
    determine, for each of the plurality of material feeding ports of each of the at least two devices, a state of Processing as a state of Pre-Processing or a state of End-Processing according to an amount of material in the material feeding port before a state of Ready To Process, and an amount of material in the material feeding port in the state of Processing;
    wherein both of the amount of material in the material feeding port before the state of Ready To Process, and the amount of material in the material feeding port in the state of Processing are detected by a sensor arranged in the material feeding port.

8. The apparatus according to claim 7, wherein the at least one processor is further configured to execute the readable program codes to:
- determine the state of Processing as the state of Pre-Processing, when the amount of material in the material feeding port in the state of Processing is greater than or equal to a half of the amount of material in the material feeding port before the state of Ready To Process; or
- determine the state of Processing as the state of End-Processing, when the amount of material in the material feeding port in the state of Processing is less than a half of the amount of material in the material feeding port before the state of Ready To Process.

9. A system for controlling logistics, comprising a handling component, at least two devices with a plurality of material feeding ports, and the apparatus for controlling logistics according to claim 1; wherein the handling component is configured to handle materials to the at least two devices under control of the apparatus for controlling logistics.

10. A method for controlling logistics, wherein a handling component handles materials to at least two devices with a plurality of material feeding ports, wherein the method comprises:
- obtaining a logistics communication state corresponding to each of the plurality of material feeding ports of each of the at least two devices;
- pairing every two material feeding ports among the plurality of material feeding ports of each of the at least two devices into a group, and determining a logistics communication state corresponding to each group of material feeding ports of each of the at least two devices;
- determining a handling priority corresponding to each of the at least two devices according to the determined logistics communication state corresponding to each group of material feeding ports of each of the at least two devices; and
- controlling the handling component to select one group of material feeding ports of a device with a highest handling priority to execute a handling command;
- wherein determining the handling priority corresponding to each of the at least two devices according to the determined logistics communication state corresponding to each group of material feeding ports of each of the at least two devices comprises:
- determining the handling priority corresponding to each of the at least two devices by referring to a pre-created correspondence relationship table between logistics communication states corresponding to respective groups of material feeding ports of respective devices, and handling priorities of the respective devices.

11. The method according to claim 10, wherein the method further comprises:
- determining, for the device with the highest handling priority, a group of material feeding ports with a highest handling priority according to logistics communication states corresponding to respective groups of material feeding ports of the device;
- controlling the handling component to select one group of material feeding ports of the device with the highest handling priority to execute the handling command comprises:
- controlling the handling component to select the group of material feeding ports with the highest handling priority in the device with the highest handling priority to execute the handling command.

12. The method according to claim 10, wherein pairing every two material feeding ports among the plurality of material feeding ports of each of the at least two devices into a group comprises:
- selecting, among the plurality of material feeding ports of each of the at least two devices, one of first material feeding ports via dichotomy among current material feeding ports which are not paired, and selecting one of second material feeding ports via dichotomy among remaining material feeding ports which are not paired to constitute a group to pair every two material feeding ports among the plurality of material feeding ports of each of the at least two devices into a group.

13. The method according to claim 12, wherein determining the logistics communication state corresponding to each group of material feeding ports comprises:
- determining, for each group of material feeding ports, a material feeding port to which a material is most desirable according to logistics communication states corresponding respectively to a first material feeding port and a second material feeding port of the group of material feeding ports; and
- determining a logistics communication state corresponding to the material feeding port to which a material is most desirable as a logistics communication state corresponding to the group of material feeding ports.

14. The method according to claim 13, wherein the material feeding port to which a material is most desirable is determined by referring to a pre-created correspondence relationship table between logistics communication states of two material feeding ports in a pair of material feeding ports, and a logistics communication state of the pair of material feeding ports.

15. The method according to claim 10, wherein the logistics communication state corresponding to each of the plurality of material feeding ports of each of the at least two devices comprises: Ready To Load, Reserved To Load, Ready To Process, Processing, Ready To Unload, or Reserved To Unload.

16. The method according to claim 15, wherein the method further comprises:
- determining, for each of the plurality of material feeding ports of each of the at least two devices, a state of Processing as a state of Pre-Processing or a state of End-Processing according to an amount of material in the material feeding port before a state of Ready To Process, and an amount of material in the material feeding port in the state of Processing;
- wherein both of the amount of material in the material feeding port before the state of Ready To Process, and the amount of material in the material feeding port in the state of Processing are detected by a sensor arranged in the material feeding port.

17. The method according to claim 16, wherein determining the state of Processing as the state of Pre-Processing or the state of End-Processing comprises:
- determining the state of Processing as the state of Pre-Processing, when the amount of material in the material feeding port in the state of Processing is greater than or equal to a half of the amount of material in the material feeding port before the state of Ready To Process; or
- determining the state of Processing as the state of End-Processing, when the amount of material in the material feeding port in the state of Processing is less than a half of the amount of material in the material feeding port before the state of Ready To Process.

18. A non-transitory computer readable medium, comprising program codes, wherein the program codes are configured to be run on a computing device to cause the computing device to perform operations in the method for controlling logistics according to claim 10.

* * * * *